Jan. 13, 1970  T. D. PIZZO ET AL  3,489,634
APPARATUS FOR BUILDING TIRES AND THE LIKE
Filed June 24, 1965  7 Sheets-Sheet 2

INVENTORS.
THOMAS D. PIZZO
ERNEST E. KWIERANT

Jack Rosin
ATTORNEY

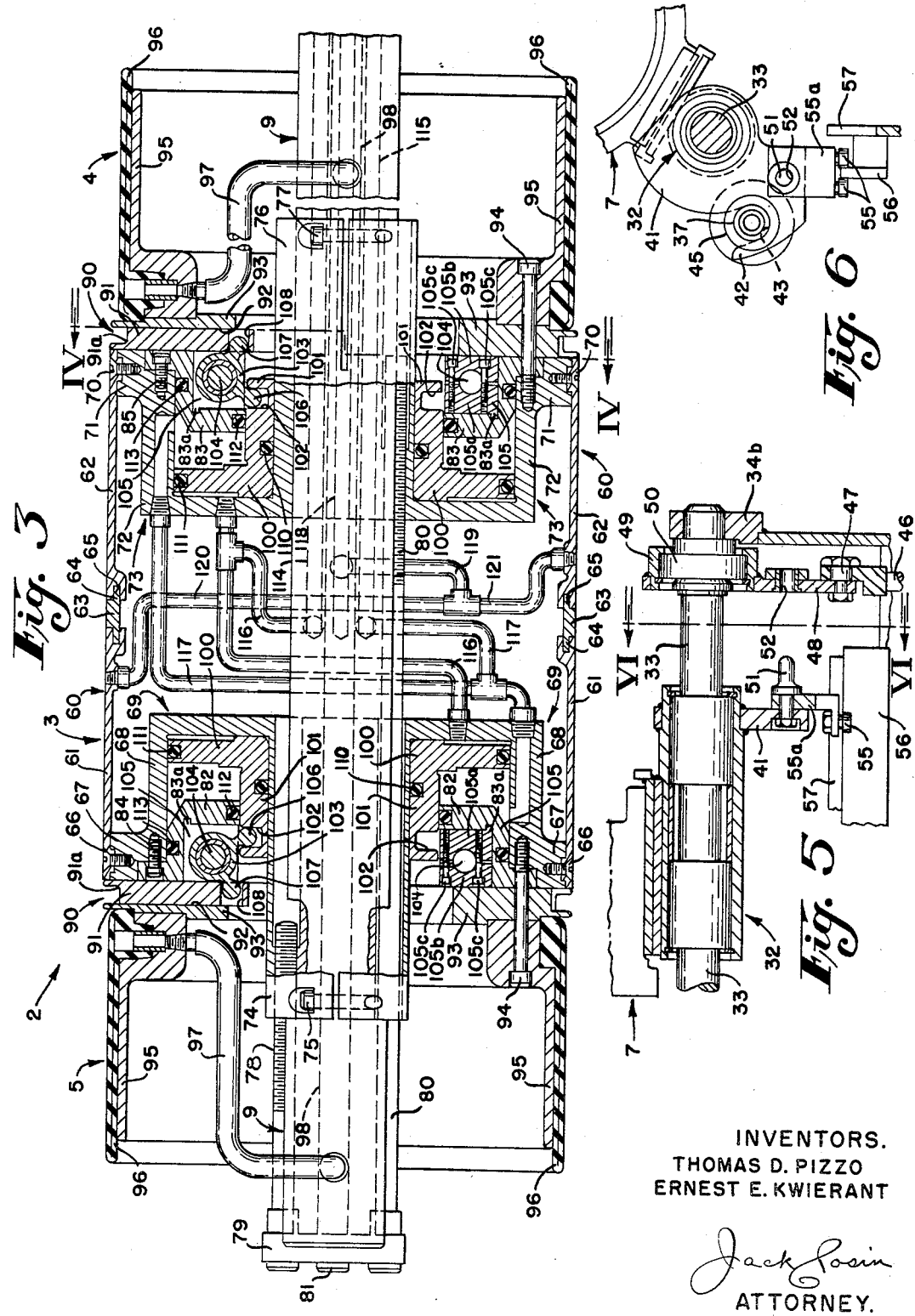

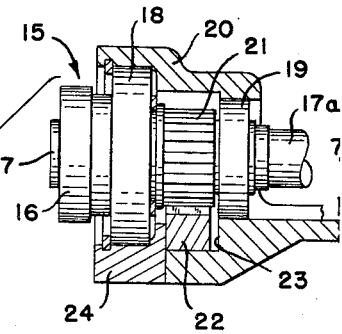
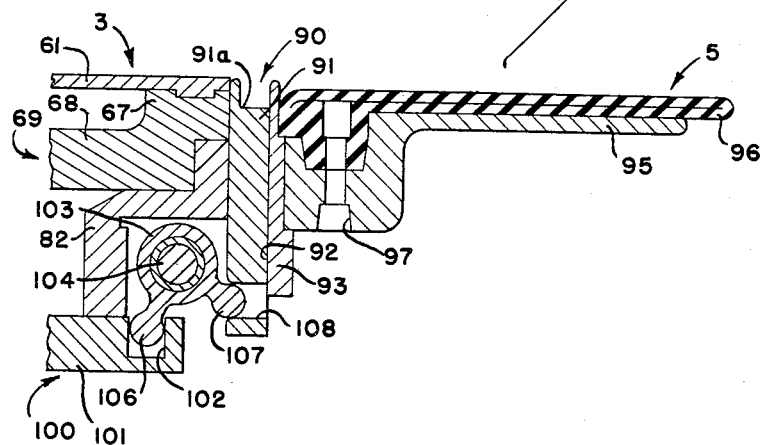
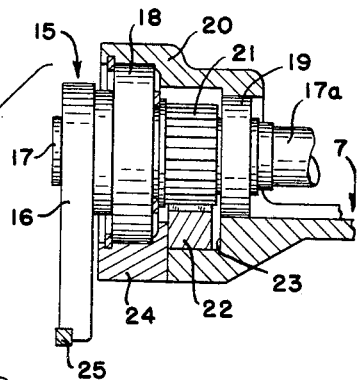
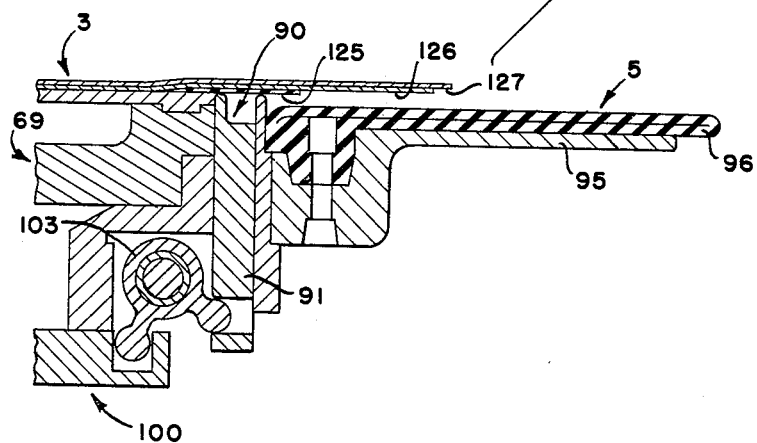
INVENTORS.
THOMAS D. PIZZO
ERNEST E. KWIERANT
ATTORNEY.

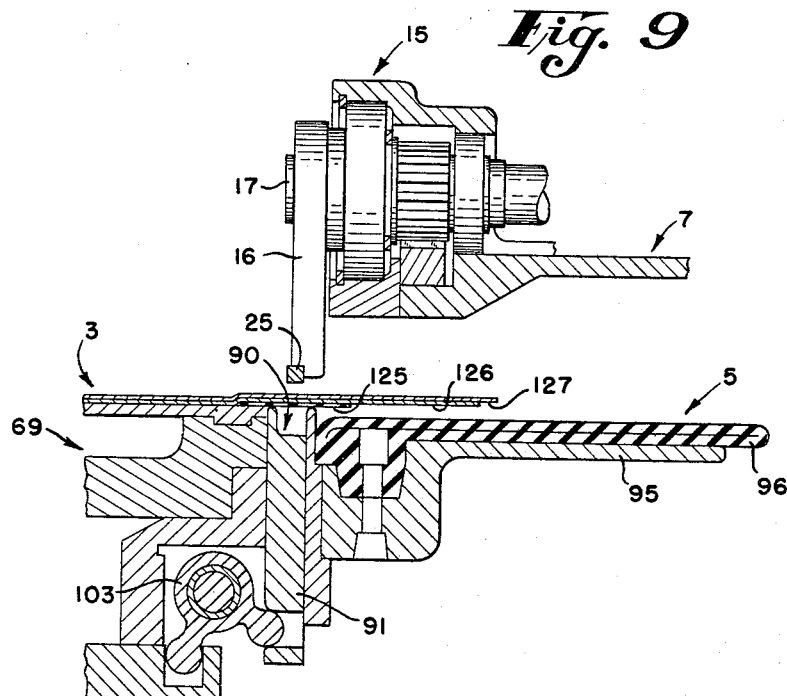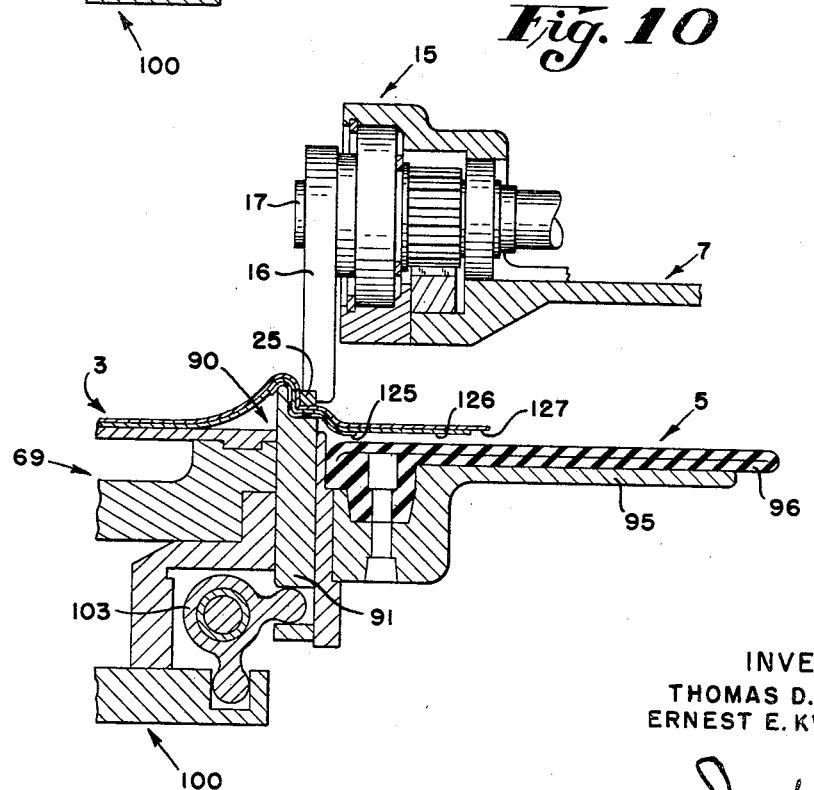

INVENTORS.
THOMAS D. PIZZO
ERNEST E. KWIERANT

ATTORNEY.

Jan. 13, 1970  T. D. PIZZO ETAL  3,489,634
APPARATUS FOR BUILDING TIRES AND THE LIKE
Filed June 24, 1965  7 Sheets-Sheet 7
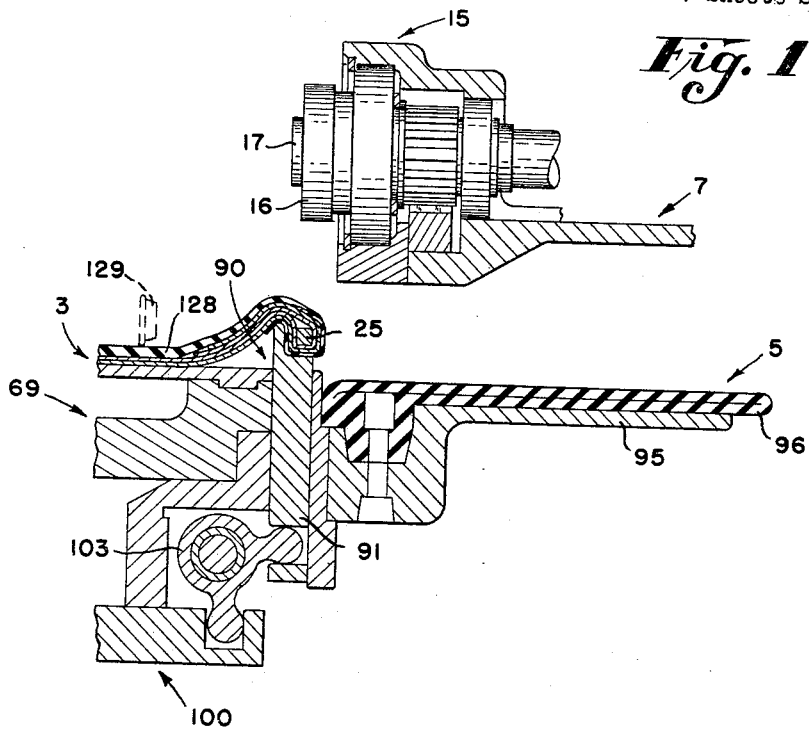
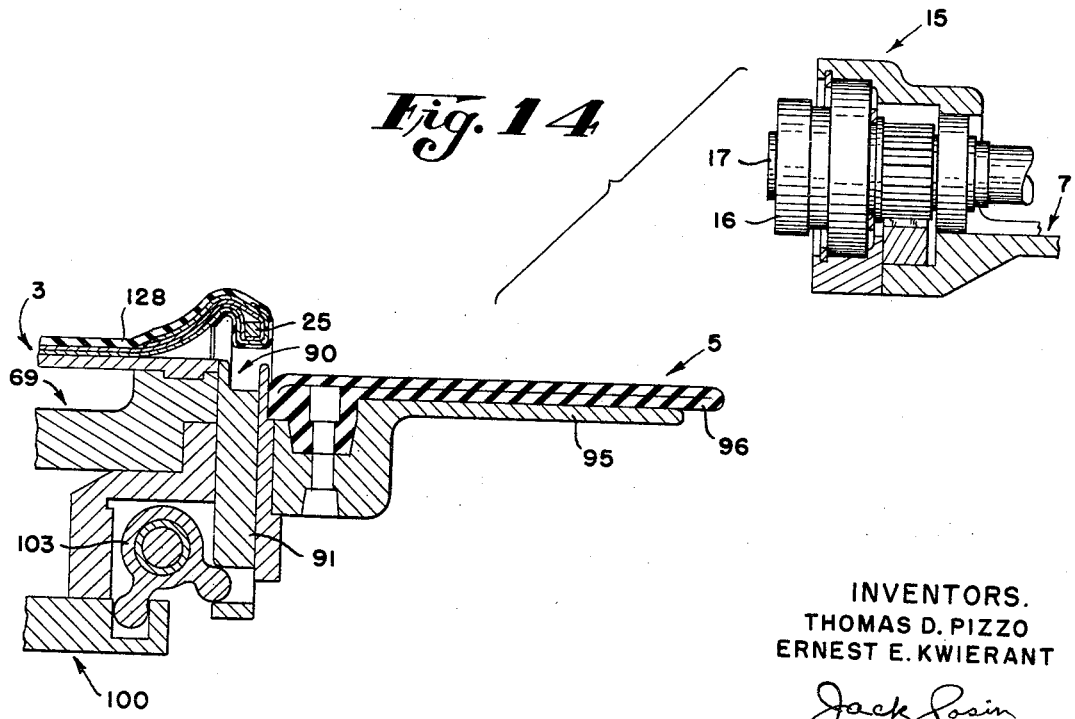
INVENTORS.
THOMAS D. PIZZO
ERNEST E. KWIERANT
Jack Rosin
ATTORNEY.

United States Patent Office 3,489,634
Patented Jan. 13, 1970

3,489,634
APPARATUS FOR BUILDING TIRES AND THE LIKE
Thomas D. Pizzo, Wyandotte, and Ernest E. Kwierant, Rochester, Mich., assignors to Uniroyal, Inc., New York, N.Y., a corporation of New Jersey
Filed June 24, 1965, Ser. No. 466,619
Int. Cl. B29h 17/16; B32b 25/02
U.S. Cl. 156—398                                   6 Claims

ABSTRACT OF THE DISCLOSURE

A tire building apparatus including a rotary drum bearing fingers movable to a position to support the tire bead by means of an annular piston and cylinder surrounding the shaft of the drum and connected to the fingers by bell cranks.

---

This invention relates to apparatus for building pneumatic tires, air springs and other laminates having axially spaced, annular anchorage or bead rings therein. The invention will be described in connection with the building of pneumatic tires, but it is not intended that it be limited to such end use.

In the manufacture of tires, plies of essentially weftless, rubberized fabric are assembled in the form of a cylindrical body on a building drum and then bead rings are anchored into the ends of the plies. Various methods may be employed in attaching the bead rings to the ply ends; however, the present invention is directed to apparatus for use in a method in which bead rings, having slightly larger diameters than the cylindrical plies on the drum, are supported concentrically about the opposite end portions of the plies, the end portions of the plies are expanded into contact with the inner peripheries of the bead rings while the central portions of the plies remain unexpanded, and then the end portions of the plies are folded or wrapped about the bead rings.

It is the main object of this invention to provide improved apparatus for building pneumatic tires, air springs and other laminates in accordance with the foregoing bead anchoring method.

It is another object of this invention to provide a building drum assembly having improved means for expanding the end portions of plies carried on the drum assembly into contact with the inner peripheries of bead rings positioned thereabout.

It is a still further object of this invention to provide a building drum assembly, including a non-expansible central drum having radially movable elements and an inflatable bladder at each of its ends, with improved means for moving said elements to expand the end portions of plies carried on the drum assembly into contact with the inner peripheries of bead rings supported about said plyends.

Further objects and advantages of this invention will become apparent as the following description proceeds.

Briefly stated, and in accordance with one embodiment of this invention, a building drum assembly is provided comprising: a shaft; a building drum rotatably supported by the shaft; a plurality of movable elements carried by the drum adjacent at least one of its edges; annual cylinder means surrounding the shaft and fixed relative thereto; and annular piston means axially movable in the cylinder means and operatively connected to the elements to move the elements radially between an inactive position and a bead engaging piston.

While the specification concludes with claims particularly pointing out and distinctly claiming the subject matter regarded as this invention, it is believed that the invention will be better understood from the following description, taken in connection with the accompanying drawings, in which:

FIG. 3 is an enlarged sectional view, taken on line III—III of FIG. 2, of the building drum assembly of the apparatus;

FIG. 5 is a fragmentary sectional view, taken on the line V—V of FIG. 2;

FIG. 6 is a fragmentary sectional view taken on the line VI—VI of FIG. 5; and

FIGS. 7–14 are enlarged, fragmentary sectional views through an edge of the building drum and a cooperating turn-over cage member, showing the apparatus in various of the configurations it assumes during fabrication of a tire carcass.

Figure 1:
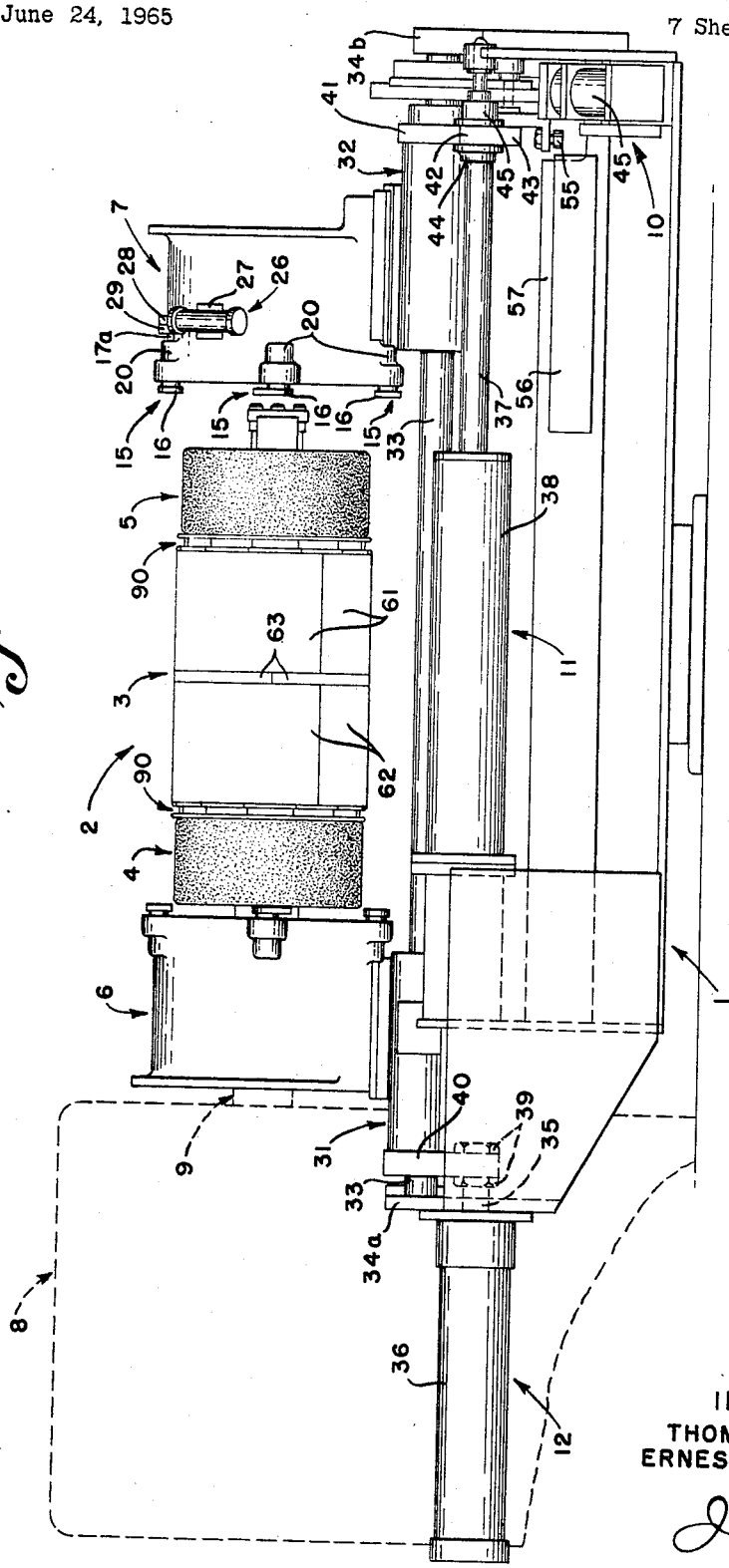
FIG. 1 is a side elevational view of a tire building apparatus embodying the present invention, portions of the apparatus being shown by means of broken lines.

Referring to FIG. 1, the building apparatus includes a frame or support, shown generally at 1, and a building drum assembly, shown generally at 2. Assembly 2 comprises a central non-expansible drum, shown generally at 3, an inboard auxiliary drum, shown generally at 4, and an outboard auxiliary drum, shown generally at 5. An inboard turn-over cage or member, shown generally at 6, and an outboard turn-over cage or member, shown generally at 7, are also provided. The building apparatus further includes a housing, shown generally at 8, which supports conventional drive motor means (not shown) and suitable controls (not shown) for selectively rotating the drums 3, 4 and 5. A shaft, shown generally at 9, supports building drum assembly 2 in a cantilever manner from housing 8.

Figure 2:
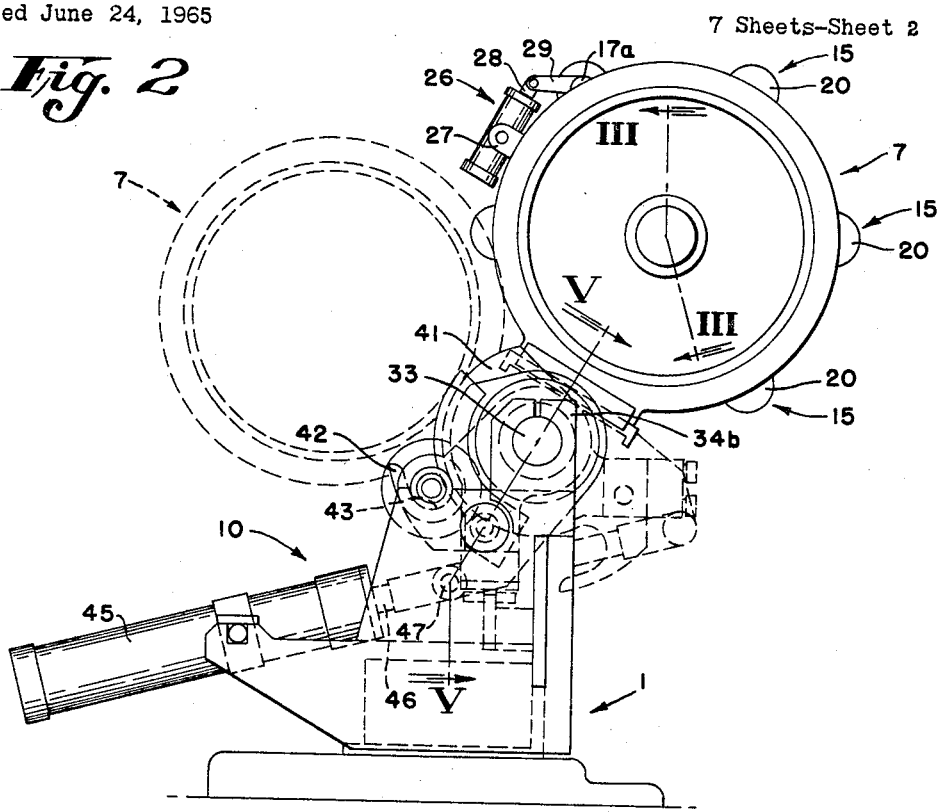
FIG. 2 is an enlarged end elevational view of the apparatus shown in FIG. 1, as viewed from the right, or outboard, end of FIG. 1.

A mechanism or means, shown generally at 10, is provided for shifting the outboard turn-over cage 7 transversely of the axis of building drum assembly 2, between the solid and broken line positions shown in FIG. 2, to permit removal of a completed tire carcass from the building drum assembly. A mechanism or means, shown generally at 11 (FIG. 1), is provided for moving outboard turn-over cage 7 axially relative to building drum assembly 2, and a similar mechanism or means, shown generally at 12, is provided for axially moving the inboard turn-over cage 6 relative to building drum assembly 2.

The turn-over cages 6 and 7 employed in the present apparatus are similar to turn-over cages shown and described in the co-pending application of N. T. Kehoe and E. A. Stiegler, Ser. No. 336, 495, filed Jan. 8, 1964, and assigned to the assignee of the present application. The invention of said co-pending application was made prior to this invention and it is, therefore, not intended to herein claim anything shown or described in said co-pending application, which is to be regarded as prior art with respect to this present application.

Referring to FIGS. 1, 2, 7 and 8, the turn-over cages 6 and 7 are each operatively mounted on frame 1 for movement axially of building drum assembly 2. The outboard cage 7 is also adapted to be swung transversely of the axis of assembly 2 to facilitate removal of completed carcasses from drum 3. Each of the turn-over cages 6 and 7 is provided with a suitable bead ring holding means comprising a plurality of bead ring holders, each generally indicated by the numeral 15. The bead ring holders 15 are mounted rotatably in equally spaced positions about the peripheries of the turn-over cages 6 and 7.

Bead ring holders 15 are each provided with a bead ring gripping finger or member 16 (FIG. 8) which is keyed to a horizontal shaft 17. Shafts 17 are each supported rotatably by spaced apart bearings 18 and 19 mounted in housings 20 formed on the peripheries of turn-over cages 6 and 7. A pinion gear 21 is keyed to each of the shafts 17. The pinion gears 21 are adapted to mesh with a ring gear 22 which is rotatably mounted in an annular groove 23 formed in the outer surface of each of the turn-over cages 6 and 7. Retainer rings 24, held in place by screws (not shown), slidably secure ring gears 22 in their grooves 23 on the turn-over cages 6 and 7.

The bead ring gripping fingers 16 are shown in FIG. 8 turned to an operative position for holding a bead ring 25. As shown in FIG. 7, they are turned to a retracted or inactive position. The bead ring gripping fingers 16 of each turn-over cage are pivoted between their operative and inactive positions by means of an air cylinder 26 (FIGS. 1 and 2) on each cage. Each cylinder 26 is carried in a bracket 27 and controls the movement of a piston rod 28 between an extended and a retracted position. An arm 29 interconnects the piston rod 28 with a shaft extension 17a on one of the bead ring holders 15 of each turn-over cage. When the piston rods 28 are moved to their retracted position, the bead ring holders 15 are pivoted to their inactive positions. When the piston rods 28 are moved to their extended positions, the bead ring holders are pivoted to their operative, bead ring holding positions.

Referring to FIGS. 1, 2, 5 and 6, turn-over cages 6 and 7 are bolted to or otherwise supported from the housings of respective cage support bearings 31 and 32 (FIG. 1) which are slidable along and rotatable about shaft 33. This allows cages 6 and 7 to be axially moved relative to building drum assembly 2 and cage 7 to be transversely moved relative thereto, as will appear in greater detail hereinafter. Shaft 33 is supported at its ends by support members 34a and 34b which are fixed to frame 1. Inboard turn-over cage 6 is actuated for axial movement by the piston rod 35 of an air cylinder 36 which comprises part of the means 12 for axially moving the inboard turn-over cage relative to drum assembly 2. Outboard turn-over cage 7 is axially moved by means of the piston rod 37 of an air cylinder 38 which comprises part of the means 11 for axially moving the outboard turn-over cage relative to the drum assembly. The piston rod 35 is rigidly connected to cage support bearing 31 via arcu-nuts 39 and a flange 40 which is welded or otherwise fixed to the cage support bearing 31. Accordingly, by suitable positioning of piston rod 35 relative to cylinder 36, inboard turn-over cage 6 may be moved axially relative to drum assembly 2 and stopped at selected positions therealong. Suitable limit switches, stops and electrical control circuits (not shown) may be provided to facilitate the moving and selective positioning of turn-over cages 6 and 7 relative to drum assembly 2 in accordance with known practices.

In order to facilitate transverse movement of the outboard turn-over cage 7 by shifting means 10, the connection between piston rod 37 and cage support bearing 32 is made separable. This has been illustrated in FIGS. 1, 2, 5 and 6. A flange 41 is welded to the outer periphery of cage support bearing 32. Flange 41 is provided with a hook 42 (FIG. 6), the bottom portion 43 of which is adapted to engage and stop against piston rod 37. Suitable collars 44 and 45 (FIG. 1) carried by piston rod 37 engage opposite sides of flange 41 adjacent hook 42 when the cage is in axial alignment with the building drum assembly 2. This insures that when turn-over cage 7 is in alignment with drum assembly 2, the turn-over cage will move axially of the drum assembly upon retraction and extension of piston rod 37 relative to cylinder 38.

When turn-over cage 7 is shifted transversely of drum assembly 2 under the influence of shifting means 10, the cage rotates about its support shaft 33, disengaging hook 42 and flange 41 from piston rod 37. This precludes inadvertent axial movement of cage 7 during the time it is out of axial alignment with drum assembly 2.

The manner in which shifting means 10 swings cage 7 transversely of drum assembly 2 will now be considered in greater detail. Shifting means 10 (FIG. 2) comprises an air cylinder 45 which drives a piston rod 46 between extended and retracted positions. Piston rod 46 (FIG. 5) is pivotally connected at 47 to one end of a lever 48. The opposite end 49 of lever 48 is journaled on a bearing 50 which is carried by the cage support shaft 33.

Referring to FIG. 5, which shows the outboard cage 7 moving to the right and nearing, but not at, its extreme outboard position, the flange 41 carried by cage support bearing 32 is provided with a pin 51 affixed thereto. Pin 51 projects from flange 41 into engagement with an aperture 52 in the lever 48 when cage 7 is at its extreme outboard position as a result of piston rod 37 (FIG. 1) being fully extended from cylinder 38. Pin 51 and aperture 52 cooperate to couple flange 41 to lever 48 so that upon extension and retraction of piston rod 46 (FIG. 2) relative to power cylinder 45, cage 7 will move transversely of drum assembly 2.

The pin 51 and aperture 52 arrangement which couples shifting means 10 to cage 7 (FIG. 5) allows the cage to be moved axially of assembly 2 by axial moving means 11, as indicated earlier. In order to avoid rotation of cage support bearing 32 about shaft 33 during such axial movement, flange 41 is provided with downwardly extending guide rollers 55 which cooperate with a guide rail 56 during axial movement of the cage 7 (see FIG. 6). Rollers 55 are carried by a bracket 55a that is fixed to flange 41. Guide rail 56 is supported by a bracket 57 that is fastened to the frame 1 of the building apparatus.

Referring to FIG. 1, which shows the cage 7 at its extreme outboard position (when piston rod 37 is fully extended from cylinder 38), it will be seen that at this position guide rollers 55 are clear of guide rail 56 to thus facilitate transverse shifting of the cage.

Figure 4:
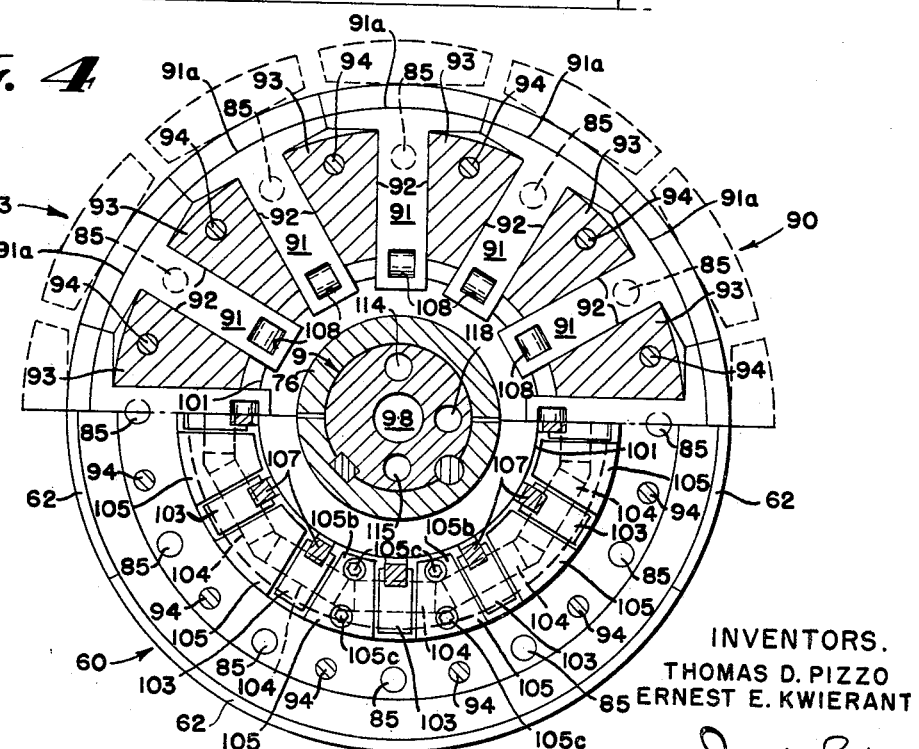
FIG. 4 is an enlarged transverse sectional view, taken on line IV—IV of FIG. 3, showing the radially movable elements at their inacitve positions in solid lines and at their bead engaging positions in broken lines.

Referring now to FIGS. 3 and 4, the building drum assembly 2 will now be considered in greater detail. As indicated earlier, drum assembly 2 comprises a central, non-expansible drum 3, an inboard auxiliary drum 4, and an outboard auxiliary drum 5. The central drum 3 is provided with an outer working surface 60 which is formed by first and second groups of arcuate segments 61 and 62, respectively, which are spaced apart by a group of arcuate spacer segments 63. The spacer segments of group 63 are provided with lips 64 which engage slots 65 formed in the segments of groups 61 and 62 and thereby rigidly interconnect the segments of the various groups together.

Each of the segment groups 61 through 63 may comprise, for example, three arcuate segments, each of which encompasses 120° of the circumferential extent of the drum and the three of which, cumulatively, make up the drum surface 60 to the longitudinal extent of its own group. The segments 61 are fastened, as by screws 66, to a flange 67 formed on the housing 68 of an annular cylinder, shown generally at 69. A similar structure, involving screws 70, flange 71, housing 72 and annular cylinder 73 serves to support the second group of arcuate segments 62.

Annular cylinder 69 is provided with an inner, split hub member 74 which is clamped to shaft 9 by means of bolts 75. Similarly, annular cylinder 73 is provided with an inner, split hub member 76 which is clamped to shaft 9 by means of bolts 77. An elongated adjustment screw 78, having one end rotatably supported in a bracket 79 and the other end in threaded engagement with hub member 74, is employed to axially position the hub member relative to shaft 9. A similar elongated adjustment screw 80, which also has one end rotatably supported in bracket 79 and the other end in threaded engagement with hub member 76, is employed in connection with axially moving hub member 76 relative to shaft 9. The bracket 79 is fixed to the end of shaft 9 by means of a bolt 81. The annular cylinders 69 and 73 are further provided with respective cylinder heads 82 and 83 which are bolted in place by bolts 84 and 85, respectively.

The longitudinal positioning of cylinders 69 and 73, accomplished by adjustment screws 78 and 80, allows the size of the central drum to be changed (by substituting different size segments in the groups of segments 61, 62 and 63) to facilitate building tires of a number of different sizes. It will be apparent, of course, that the bolts 75 and 77 must be loosened prior to changing the axial positions of the hubs 74 and 76 on shaft 9.

The structures associated with annular cylinder 69 and outboard auxiliary drum 5 are essentially similar to the structures associated with annular cylinder 73 and inboard auxiliary drum 4. Accordingly, this discussion will proceed with a description of the structures associated with annular cylinder 73 and the auxiliary drum 4, it being understood, however, that the description also applies to annular cylinder 69 and auxiliary drum 5.

A means, shown generally at 90, is provided at each end of the central drum 3 for expanding the end portions of plies carried on the drum into contact with the inner peripheries of bead rings positioned about but radially spaced from the end portions of the plies. Referring to FIG. 4, the expanding means 90 includes a plurality of T-shaped elements or fingers 91 which are movable between the inner or radially retracted, inactive position shown in solid lines in FIG. 4, and the outer or radially extended, bead engaging position shown by broken lines in this figure. The radially outer portions of fingers 91 are arcuate in shape circumferentially of drum 3 and are provided with bead receiving shoulders 91a (FIG. 3) formed therein, the cumulative circumferential length of the outer portions of fingers 91 being substantially equal to the circumference of drum 3. Fingers 91 are radially movable in channels 92 formed at circumferentially spaced locations about a backup plate 93. The backup plate 93 is held in place by means of bolts 94 which threadedly engage the housing 68 of annular cylinder 69. Bolts 94 also serve to fasten a cylindrical support or shell 95 to the central drum 3, the shell 95 in turn supporting an inflatable bladder 96. A suitable conduit 97, which communicates with a duct 98 formed internally of the shaft 9, is employed to conduct air under pressure to and release compressed air from the bladder 96 in connection with folding the ply ends over the bead rings, as will appear hereinafter in greater detail.

The fingers 91 are moved between their radially inner, inactive position and their radially outer, bead engaging position by means of an annular piston 100 (FIG. 3) that is axially movable in annular cylinder 73. Piston 100 is provided with an annular piston rod 101 having a circumferential groove 102 formed therein. A plurality of bell cranks 103 are pivotally mounted about the hub 76 on respective pins 104, there being one bell crank 103 and one pin 104 for each finger 91. The pins 104 are supported by wedge shaped members 105 (FIG. 4), and the entire sub-assembly of bell cranks 103, pins 104 and wedges 105 is supported between the outward face of cylinder head 83 and the inward face of backup plate 93 (FIG. 3), there being a lip and groove structure 83a to insure correct placement of parts. Two of the wedges 105 are made of split construction including two halves 105a and 105b which are fastened together by bolts 105c. This arrangement facilitates the installation of the sub-assembly into its position in drum 3.

The bell cranks 103 interconnect annular piston rod 101 with fingers 91 and serve as motion converting means to convert the axial movement of piston rod 101 into the radial movement of fingers 91. The bell cranks 103 are each provided with a first arm 106 in engagement with the groove 102 of piston rod 101. A second arm 107 on each bell crank 103 is in engagement with a respective slot 108 formed in each of the fingers 91. Accordingly, when piston 100 is shifted axially in cylinder 69, bell cranks 103 pivot about their pins 104 and force the fingers 91 to move radially in their slots 92.

Inner and outer O-rings 110 and 111, respectively (FIG. 3), are carried by the annular piston 100 to seal the inner and outer surfaces of piston 100 relative to annular cylinder 73. Similar inner and outer O-rings 112 and 113, respectively, are carried by the cylinder head 83 to seal the cylinder head relative to the annular piston rod 101 and the annular cylinder 73.

In order to move the annular pistons 100 axially of the annular cylinders 69 and 73, compressed air is lead to and evacuated from opposite ends of annular cylinders 69 and 73 via ducts 114 and 115 in shaft 9 and via respective conduits 116 and 117, there being suitable pneumatic and electric circuits (not shown) provided for controlling such air flow. From the foregoing, it will be seen that when conduit 116 is pressurized and conduit 117 is connected to atmosphere, the piston 100 will move axially outwardly of the central drum 3 (away from each other), causing fingers 91 to move from their inactive positions to their bead engaging positions. Conversely, when conduit 116 is connected to atmosphere and conduit 117 is pressurized, the annular pistons 100 will both move axially inwardly of central drum 3 (toward one another), causing the fingers 91 to be moved from their bead engaging positions to their inactive positions.

In order to provide a means for breaking the adhesion between the carcass body formed on drum 3 and the surface 60 thereof, a compressed air supply duct 118 is provided internally of shaft 9. This duct communicates with a conduit 119 having branches 120 and 121 which lead to the surface 60 of the central drum 3. When compressed air is lead through duct 118 and conduits 119, 120 and 121, the compressed air is discharged into the space between surface 60 and the surrounding carcass body, causing partial inflation of the body and a breaking of the adhesion between the body and the drum.

The operation of the apparatus described herein will now be considered in connection with the manufacture of a tire. At the start of a tire building operation, the apparatus is in the condition shown in FIGS. 1, 2 and 7, in which the bead ring holding means 15 are in their retracted positions, the ply end expanding means 90 are retracted, the cages 6 and 7 are outward of the drums 2, 3 and 4, and cage 7 is in axial alignment with assembly 2. The first steps in the tire building operation involve rotating the bead ring holding means 15 from the position shown in FIG. 7 to the position shown in FIG. 8 and positioning bead rings 25 in contact with each set of bead ring gripping fingers 16. As indicated earlier, the rotation of fingers 16 to the position shown in FIG. 8 is accomplished by extending the piston rod 28 (FIG. 1) from its air cylinder 26.

Figure 11:
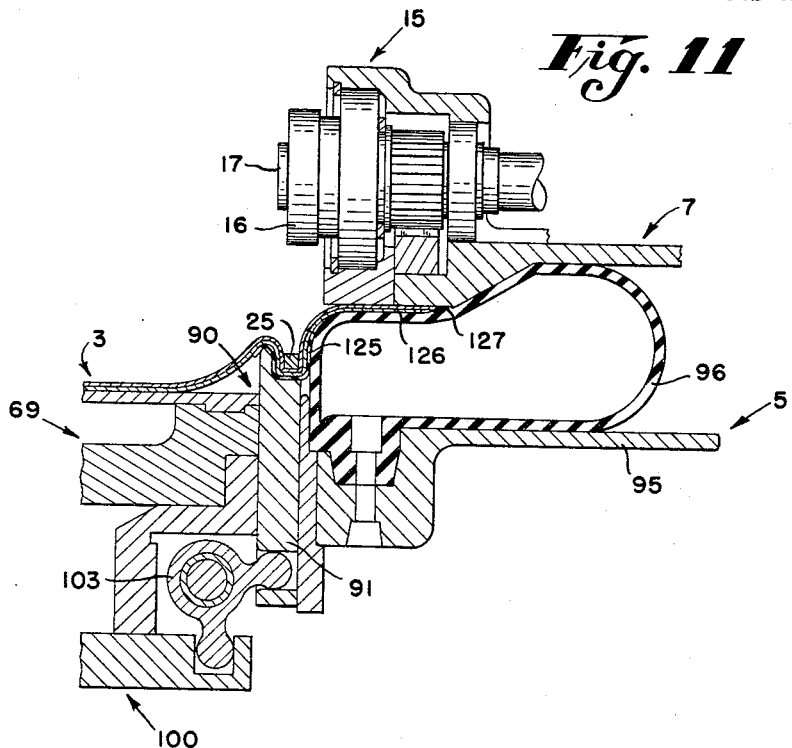

At this point toe strips 125 (FIG. 8) are wound about each end of central drum 3 and then first and second plies 126 and 127 are applied to the central drum, in accordance with usual practices. Thereafter, referring to FIG. 1, the means 11 and 12 for axially moving the outboard and inboard cages 7 and 6, respectively, are actuated to position the bead rings 25 in radial alignment with the radially movable fingers 91, as shown in FIG. 9. The annular cylinders 69 and 73 are then actuated to cause the annular pistons 100 to move axially outwardly, causing the fingers 91 to move radially outwardly. Accordingly, the end portions of the plies are moved into engagement with the inner peripheries of the bead rings 25, as shown in FIG. 10. At this time bead rings 25 are locked into position relative to plies 126 and 127. The air cylinders 26 (FIG. 1) are now actuated to retract piston rods 28, thereby rotating all of the bead ring holding means 15 to their inactive positions, as shown in FIG. 11. Concurrently with this operation, the bladders 96 are inflated to cause further adhering of the plies 126 and 127 to the bead rings 25, as shown in FIG. 11.

Figure 12:
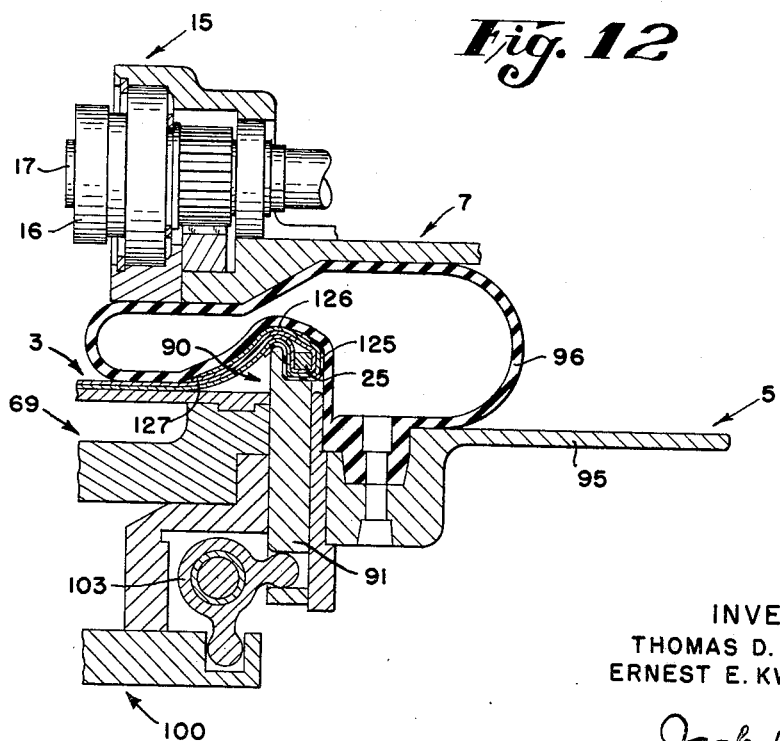

When the bead ring holding means 15 have been retracted to their inactive positions and the bladders 96 have been fully inflated, the cage moving means 11 and 12 are again actuated to move cages 6 and 7 further toward one another, to the positions shown in FIG. 12. As a result, the end portions of the plies 126 and 127 are turned inwardly over the bead rings and adhered to the portions of the plies located inwardly of the bead rings, as shown in FIG. 12. When this operation has been completed, bladders 96 are deflated and, concurrently therewith, the cages 6 and 7 are moved from their inboard positions toward their outboard positions, as shown in FIG. 13. At this point a tread and sidewall slab 128 is applied atop the folded over plies 126 and 127, and the entire assembly is then stitched together by a stitching wheel, shown generally at 129 in FIG. 13. The raw tire is now completed and the fingers 91, which have been supporting the bead rings in accurate axial relationship with the remainder of the tire components during the entire fabrication of the tire, can now be retracted.

Accordingly, fingers 91 are retracted to their inactive position, as shown in FIG. 14, and release air is applied through duct 118 (FIG. 3) and conduits 119, 120 and 121 to the space between the carcass and the central drum 3 to break the adhesion therebetween. Concurrently with this, the means 10 for transversely moving the outboard cage 7 relative to the drum assembly 2 is actuated and the outboard cage moves from the solid line position shown in FIG. 2 to the dotted line position shown in that figure. At this point the operator can grasp the beaded end of the carcass and pull the completed carcass off of the drum assembly 2. When this has been done, the means 10 for moving the outboard cage 7 transversely of the assembly is again actuated to move the cage back into alignment with the building drum assembly 2. The tire building apparatus is now in the same condition as it was when the tire building operation started (FIG. 7) and it is ready to be employed in the building of another tire.

From the foregoing, it will be seen that this invention provides improved apparatus for building tires, air springs and other laminates by known methods. The annular cylinder-annular piston-bell crank mechanism utilized herein to move the fingers 91 between their inner, inactive positions and their outer, bead engaging positions represents a compact, positive-acting mechanism of high accuracy and reliability. Its utilization in conjunction with tire building apparatus enables tires to be built rapidly and with great uniformity on the apparatus.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the spirit and scope of this invention.

Having thus described our invention, what we claim and desire to protect by Letters Patent is:

1. A building drum assembly, comprising a shaft; a building drum rotatably supported by said shaft; a plurality of radially movable fingers carried by said drum adjacent at least one of its edges; annular cylinder means surrounding said shaft; annular piston means positioned in said cylinder means, one of said means being axially movable relative to the other of said means; and bell crank means pivotally mounted in said drum and interconnecting said one of said means and said fingers to move said fingers radially between an inactive position and a bead engaging position in response to axial movement of said one of said means.

2. A building drum assembly, comprising a shaft; a building drum rotatably supported by said shaft; a plurality of movable fingers carried by said drum adjacent at least one of its edges, said fingers being rotatable with said drum, the radially outer portion of each of said fingers being arcuate in shape circumferentially of said drum; annular cylinder means surrounding said shaft and fixed relative thereto; annular piston means axially movable in said cylinder means; and motion converting means interconnecting said piston means and said fingers to move said fingers radially between a retracted, inactive position and an extended, bead supporting position in response to axial movement of said piston means.

3. A building drum assembly, comprising a shaft; a building drum rotatably supported by said shaft and including a non-expansible central portion; a plurality of movable fingers carried by said drum adjacent each of the edges of said central portion, the radially outer portion of each of said fingers being arcuate in shape circumferentially of said drum and being provided with a circumferentially extending bead receiving shoulder; annular cylinder means carried by said shaft and concentric therewith; annular piston means positioned in said cylinder means, one of said means being axially movable relative to the other of said means; and bell crank means pivotally mounted in said drum and interconnecting said one of said means and said fingers to move said fingers radially between a retracted, inactive position and an extended, bead engaging position in response to axial movement of said one of said means.

4. A building drum assembly, comprising a shaft; a drum rotatably supported by said shaft, said drum having a non-expansible central portion; first and second sets of radially disposed fingers carried by said drum adjacent respective edges of said central portion, the radially outer portion of each of said fingers being arcuate in shape circumferentially of said drum and being provided with a circumferentially extending bead receiving shoulder, the cumulative lengths of said outer portions being substantially equal to tthe circumference of said central portion of said drum; and first and second means carried by said shaft within said drum and in engagement with said respective sets of fingers to move said fingers radially in respective first and second planes perpendicular to the axis of said drum between retracted, inactive positions and extended, bead engaging positions, each of said first and second finger moving means comprising an annular cylinder carried by and concentric with said shaft, an annular piston axially movable in said cylinder, and a plurality of bell cranks pivotally mounted in said drum and interconnecting said annular piston with the fingers in one of said sets of fingers so that axial movement of said piston relative to said drum results in radial movement of said fingers.

5. Apparatus for building a cylindrical body of flexible vulcanizable material with a substantially inextensible bead ring anchored in at least one of its ends, said apparatus comprising a shaft; a cylindrical drum rotatably carried by said shaft and adapted to receive at least one ply of said material thereon with at least one end portion of said ply extending axially beyond an edge of said drum; means to support said bead ring about said end portion of said ply at a location radially spaced from said end portion and axially inward of the edge of said ply; a plurality of movable fingers carried by said drum adjacent an edge thereof, said fingers being rotatable with said drum, the radially outer portion of each of said fingers being arcuate in shape circumferentially of said drum, said fingers being within said end portion of said ply; annular cylinder means surrounding said shaft and fixed relative thereto; annular piston means axially movable in said cylinder means; means interconnecting said piston means and said fingers to move said fingers radially outwardly and thereby move said end portion of the ply into supporting engagement with the inner periphery of said bead ring; and means to fold the outward end portion of said ply axially inwardly about said bead ring.

6. Apparatus for building a cylindrical body of flexible vulcanizable material having a substantially inextensible bead ring anchored in at least one of its ends, said apparatus comprising: a shaft; a nonexpansible cylindrical drum rotatably carried by said shaft and adapted to receive at least one ply of said material thereon with at least one edge of said ply extending axially beyond an edge of said drum; means to support said bead ring about said end portion of said ply at a location radially spaced from said end portion and axially inward of the edge of said ply; a plurality of movable fingers carried by said drum adjacent an edge thereof and rotable with said drum, the radially outer portion of each of said fingers being arcuate in shape circumferentially of said drum; means for moving said fingers radially outwardly to expand said end portion of the ply into supporting engagement with the inner periphery of said bead ring, said means comprising an annular cylinder positioned coaxially within said drum and fixed relative to said shaft, an annular piston axially movable within said cylinder and motion converting means rotatable with said drum and said shaft and interconnecting said piston with said movable fingers for radially moving said fingers in response to axial movement of said pistons; and means to fold the outward end portion of said ply axially inwardly about said bead ring.

References Cited

UNITED STATES PATENTS

| | | | |
|---|---|---|---|
| 2,838,091 | 6/1958 | Kraft | 156—400 |
| 3,035,629 | 5/1962 | Vanzo et al. | 156—415 X |
| 3,093,531 | 6/1963 | Frohlich et al. | 156—400 |
| 2,409,974 | 10/1946 | Breth et al. | 156—132 |
| 2,878,856 | 3/1959 | Pacciarini et al. | 156—400 |
| 3,016,321 | 1/1962 | Beckadolph et al. | 156—402 |
| 3,171,769 | 3/1965 | Henley et al. | 156—401 X |
| 3,232,817 | 2/1966 | Nadler et al. | 156—398 |
| 3,237,199 | 2/1966 | Brey | 156—398 |

FOREIGN PATENTS 620,660    3/1949    Great Britain.

HAROLD ANSHER, Primary Examiner

C. B. COSBY, Assistant Examiner

U.S. Cl. X.R.

156—415